United States Patent [19]
Roth

[11] Patent Number: 6,054,164
[45] Date of Patent: Apr. 25, 2000

[54] APPARATUS AND METHOD FOR MANIPULATING FOODSTUFFS TO REDUCE MICROBE CONTENT

[76] Inventor: Eldon Roth, 891 Two Rivers Dr., Dakota Dunes, S. Dak. 57049

[21] Appl. No.: 09/144,928

[22] Filed: Sep. 1, 1998

[51] Int. Cl.[7] ........................................ A23L 3/36
[52] U.S. Cl. .......................... 426/524; 62/320; 426/513; 426/518; 426/519
[58] Field of Search ................... 62/32, 341, 62; 99/485, 517; 425/363, 369; 426/512, 513, 517, 519, 524, 518

[56] References Cited

U.S. PATENT DOCUMENTS

| | | | |
|---|---|---|---|
| 3,728,136 | 4/1973 | Langlands | 426/513 |
| 4,036,997 | 7/1977 | VerBurg . | |
| 4,072,763 | 2/1978 | Mart . | |
| 4,192,899 | 3/1980 | Roth . | |
| 4,210,677 | 7/1980 | Huffman | 426/513 |
| 4,258,068 | 3/1981 | Huffman . | |
| 4,474,823 | 10/1984 | Nishikawa et al. . | |
| 4,594,253 | 6/1986 | Fradin | 426/513 |
| 4,783,290 | 11/1988 | Simelunas | 426/513 |
| 4,943,442 | 7/1990 | Shack et al. | 426/513 |
| 4,973,492 | 11/1990 | Gibson | 426/513 |
| 5,193,350 | 3/1993 | Tallafus | 426/513 |
| 5,316,745 | 5/1994 | Ting et al. . | |
| 5,631,035 | 5/1997 | Clarke et al. | 426/513 |
| 5,690,989 | 11/1997 | Clarke et al. . | |
| 5,711,972 | 1/1998 | Schedin et al. | 426/363 |

FOREIGN PATENT DOCUMENTS 1223159  2/1971  United Kingdom .

*Primary Examiner*—William Tapolcai
*Attorney, Agent, or Firm*—Russell D. Culberston; Shaffer & Culbertson, LLP

[57] ABSTRACT

A manipulating apparatus (10) receives a plurality of previously frozen pieces of foodstuffs or workpieces (23) and physically manipulates or stresses the workpieces while they remain in a frozen state. The physical manipulation causes relative movement between various points within the volume of the workpieces (23) and kills microbes within the foodstuff. One preferred manipulating apparatus includes a pair of spaced apart, ridged rollers (24,25). The rollers (24,25) have a minimum clearance less than an initial thickness of the workpieces (23). A drive arrangement (30) drives the rollers (24,25) in counter-rotating fashion toward each other to pull workpieces (23) through the minimum clearance area. As the workpieces (23) pass between rollers (24,25), the workpiece material spreads out laterally and bends between opposing ridges (38). This lateral spreading and bending produces relative movement throughout the volume of the workpieces (23).

19 Claims, 5 Drawing Sheets

APPARATUS AND METHOD FOR MANIPULATING FOODSTUFFS TO REDUCE MICROBE CONTENT

TECHNICAL FIELD OF THE INVENTION

This invention relates to food processing, and more particularly, to reducing microbe content in processed foodstuffs. The invention encompasses both an apparatus and method for physically manipulating foodstuffs to reduce microbe content.

BACKGROUND OF THE INVENTION

Most foods are processed in some way before reaching the consumer. For example, vegetables may be washed, trimmed, blanched, and than frozen prior to distribution. Meat products also require significant processing before reaching the consumer. At the very least, the animal carcass is cut into segments and the larger cuts of meat or fillets are cut from these initial segments. Other usable elements remaining after separating the larger cuts of meat are then separated from the remaining unusable elements such as bone and then ground or chopped, mixed, and then commonly frozen for distribution.

Foodstuffs are inevitably exposed to microbes as the foodstuffs are processed or handled. Microbes are part of the natural decay process of organic material and may be deposited on foodstuffs through the air or by contact between the foodstuff and contaminated equipment or other material. Although some microbes may be relatively benign, others contribute to spoilage and some can cause serious illness. Lactic acid producing bacteria are examples of benign microbes, while some strains of *E Coli,* Salmonella, Listeria, and Staph bacteria are examples of pathogenic microbes which can cause serious illness when ingested by humans.

Even with careful processing practices, foodstuffs may be exposed to pathogenic microbes during processing or initial handling. The risk of illness from dangerous microbes which may be present in foodstuffs is reduced by a careful handling and cooking by the consumer. For larger cuts of meat for example, dangerous microbes may commonly only be present on the surface of the meat and are readily killed in the cooking process.

Ground or chopped and mixed foodstuffs, including ground beef, may carry dangerous microbes which are killed only after thoroughly cooking the material. The reason for this is that dangerous microbes residing at the surface of a larger piece of the foodstuff may be distributed throughout the final ground or chopped product as the large piece is ground and mixed together with other pieces. Thorough cooking is required in order to kill microbes residing in the center of a piece of ground and mixed foodstuff.

It is therefore desirable to control the growth of microbes and reduce microbe content in foodstuffs. Microbe content and growth in foodstuffs may be reduced by applying chemical additives or preservatives to the foodstuff. These chemical additives or preservatives, however, may not be acceptable to consumers, or may have undesirable effects on foodstuffs.

Alternatively to chemical additives or preservatives, heat may be used to kill microbes in foodstuffs. However, heat processing or sterilization often has undesirable effects on the quality or characteristics of the foodstuff and may make the food product undesirable to the consumer.

SUMMARY OF THE INVENTION

It is a broad object of the invention to provide a method for reducing microbe content in foodstuffs, particularly meats, and to provide an apparatus for performing the method.

The method of the invention comprises physically manipulating or applying stress to a foodstuff while the foodstuff is in a frozen state. The physical manipulation produces significant relative movement within the foodstuff. In this sense "relative movement" means movement between one point in the foodstuff and adjacent points in the foodstuff. While the mechanism by which the process reduces live microbe count is not fully understood, physical manipulation according to invention has been shown to significantly reduce microbe content in the treated foodstuffs.

The process according to the invention may be performed as a continuous process or as a batch process. In either case, a workpiece, comprising preferably a small piece of comminuted foodstuff to be processed, is first cooled by a suitable freezer to a process temperature below the freezing point of the foodstuff. As used in this disclosure and the accompanying claims, the "freezing point of the foodstuff" means the temperature at which ice crystals begin to form in the foodustuff to be processed. After freezing the workpiece, a manipulating arrangement then manipulates the frozen workpiece to produce relative movement preferably throughout the workpiece. The manipulating arrangement may define a working area and operate to manipulate the workpiece as it passes or is drawn through the working area.

In one form of the invention, the manipulating arrangement comprises first and second spaced apart rollers. The working area is defined between the first and second rollers. The rollers are preferably driven in a counter-rotating fashion to draw a workpiece there between. The spacing between the first and second rollers is smaller than an initial thickness of the workpiece so that the frozen workpiece is compressed and allowed to spread out laterally as it passes between the rollers.

Each roller may include a plurality of the spaced apart longitudinal ridges. The ridged rollers may be rotated such that each ridge on one roller registers with the space between a pair of adjacent ridges on the opposite roller as the rollers are rotated, similar to the cogs of two intermeshed gears. However, the ridges preferably do not touch, but maintain a minimum clearance. This ridged roller form of manipulating arrangement has the advantage that the frozen workpiece not only spreads out laterally as it is drawn between the rollers but is also bent between the opposing ridges on the counter-rotating rollers.

Another form of manipulating arrangement within the scope of the invention comprises two opposing plates with a suitable actuator, or actuators, for pressing the opposing plates together. The process includes placing a plurality of workpieces between the two plates and then operating the actuator arrangement to press the plates together to significantly reduce the volume between the plates. The relative movement of the plates presses the previously frozen workpieces into a block of frozen material. In this arrangement, the desired relative movement in the workpieces occurs as the randomly arranged workpieces deform to fill voids which are left between adjacent workpieces as the workpieces are initially placed in the area between the opposing plates.

Regardless of the particular manipulating arrangement employed to manipulate the frozen workpieces according to the invention, a manipulator cooling system preferably cools the surfaces of the manipulating arrangement which come in contact with the frozen workpieces. The manipulator cooling system ensures that heat from the surfaces of the manipulating arrangement do not raise the temperature of the workpieces to a temperature above the desired process temperature. Cooling the surfaces of the manipulating arrangement to a temperature near the process temperature or slightly above the process temperature also helps prevent the workpieces from sticking to the manipulator surfaces.

The apparatus for performing the process according to invention preferably includes a transport system for moving the workpieces from one process point to another. One transport device may convey the workpieces from the freezer to the manipulating arrangement. The transport system may also include a device for conveying the manipulated workpieces to associated equipment for packaging or further processing.

The apparatus according to the invention may also include a workpiece forming device for forming the foodstuffs into the desired workpieces. The forming device is preferably associated with the freezer for cutting frozen workpieces from a sheet of frozen foodstuff material.

These and other objects, advantages, and features of the invention will be apparent from the following description of the preferred embodiments, considered along with the accompanying drawings.

DESCRIPTION OF THE PREFERRED EMBODIMENTS

Figure 1:
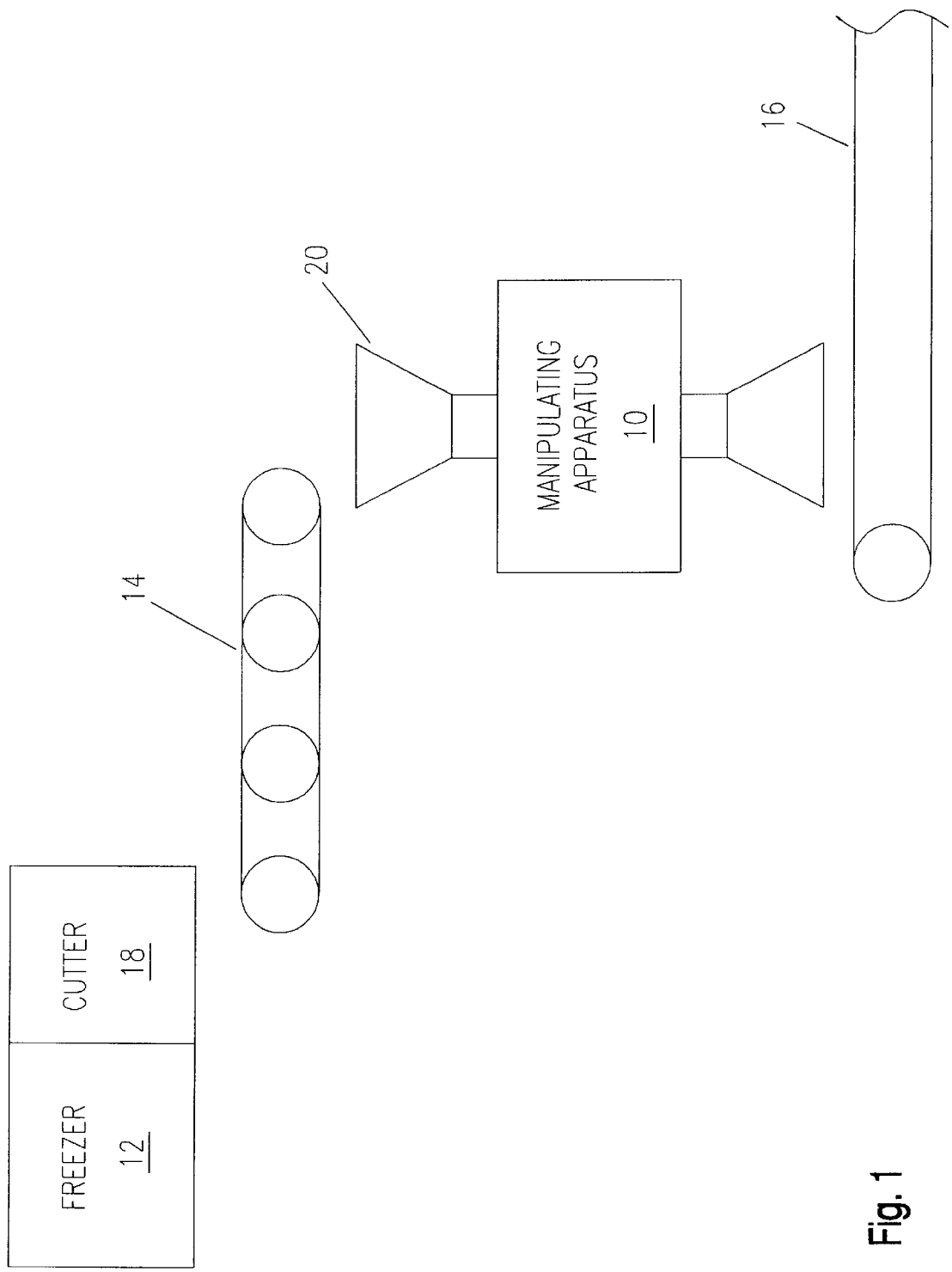
FIG. 1 is a diagrammatic representation of a foodstuff manipulating system embodying the principles of the invention.

Referring to FIG. 1 an apparatus 10 for manipulating foodstuffs is associated with a suitable freezer 12. A transport device 14 is positioned between the freezer 12 and manipulating apparatus 10. A second to transport device 16 may be positioned at an outlet from the manipulating apparatus 10 for transporting treated foodstuffs to further processing equipment.

Freezer 12 freezes the foodstuffs to be treated and places the frozen foodstuffs on transport device 14. Transport device 14 transports the workpieces to manipulating apparatus 10. Manipulating apparatus 10 physically manipulates the frozen foodstuffs to produce relative movement between different points in the volume of the foodstuffs. This relative movement occurs preferably throughout the entire volume of the foodstuffs during the treatment process. It is believed that the relative movement caused by manipulating apparatus 10 damages the cell walls of microbes in the foodstuffs thereby killing the microbes. This damage to the microbes may be accomplished as ice crystals are pressed against the microbe cell walls in the course of the manipulation. The microbes may also become brittle at the processing temperature employed by the invention and the manipulation may serve to damage the cell walls in this relatively brittle state. Although the mechanism by which microbe kill his accomplished is not fully understood, tests of the apparatus and process according to the invention indicate significant microbe kill.

The freezer 12 may be any suitable device capable of cooling foodstuffs to a process temperature below the freezing point of the foodstuffs. For example, freezer 12 may comprise a roller-type freezer as disclosed in U.S. Pat. Nos. 4,138,768 and 4,192,899, which are incorporated herein by this reference. Regardless of the particular type of freezer employed, freezer 12 preferably freezes the foodstuffs to be processed in less than thirty (30) minutes and optimally in less than about ten (10) minutes. The roller-type freezer disclosed in U.S. Pat. Nos. 4,138,768 and 4,192,899 is particularly well-suited for rapidly freezing foodstuffs into thin sheets of material which may then be cut into small sections. Freezing times of approximately 2 minutes may be obtained using these roller-type freezers. Regardless of the freezer type, rapid freezing is preferable for purposes of this invention because rapid freezing produces relatively smaller ice crystals as compared to a slow freezing process. It is believed that the smaller ice crystals produced by rapidly freezing a foodstuff result in better microbe kill during the manipulation or stressing step according to the invention.

Freezer 12 also preferably has associated with it a forming arrangement for forming the foodstuffs into workpieces comprises discrete pieces of foodstuffs. The forming arrangement may comprise a cutting system 18 such as the cutting system shown in U.S. Pat. No. 4,192,899. This cutting arrangement 18 cuts workpieces from the sheet of frozen foodstuff produced by freezer 12. Alternatively, the foodstuffs may be formed in an unfrozen state and then frozen to the process temperature. In any event, the workpieces preferably comprise approximately half-inch by half-inch squares having a thickness of approximately 0.25 to 0.125 inches. Although larger workpieces may be used within the scope of invention, the thickness of workpieces is preferably less than 0.75 inches. The thinness of the workpieces helps ensure relative movement throughout the volume of the workpiece as the workpiece is manipulated according to the invention. Also, thin workpieces may be cooled more quickly to the process temperature.

Transport device 14 preferably comprises a vibrating conveyor capable of receiving the frozen workpieces from freezer 12 and forming system 18, and transporting the workpieces to an inlet 20 associated with manipulating apparatus 10. Details of the transport device 14 are not shown in the figures since a number of different types of conveying devices may be employed within the scope of invention, and in any event the details of such conveying devices are well within the knowledge of those skilled in the present field. Transport device 14 preferably moves the frozen workpieces quickly to the manipulating device 10 so that the workpieces are manipulated as quickly as possible after being frozen to the process temperature. It is believed that microbes which have been maintained at the process temperature for a long period of time can survive the manipulation better. In the preferred form of the invention, manipulating device 10, freezer 12, and transport device 14 are situated and operated such that the workpieces are manipulated according to the invention as quickly as possible after reaching the process temperature, and preferably no more than about ten (10) minutes, about thirty (30) minutes, or about one hour, or as much as 24 hours, after the workpieces reach the process temperature although longer periods may be used within the scope of the invention.

Figure 2:
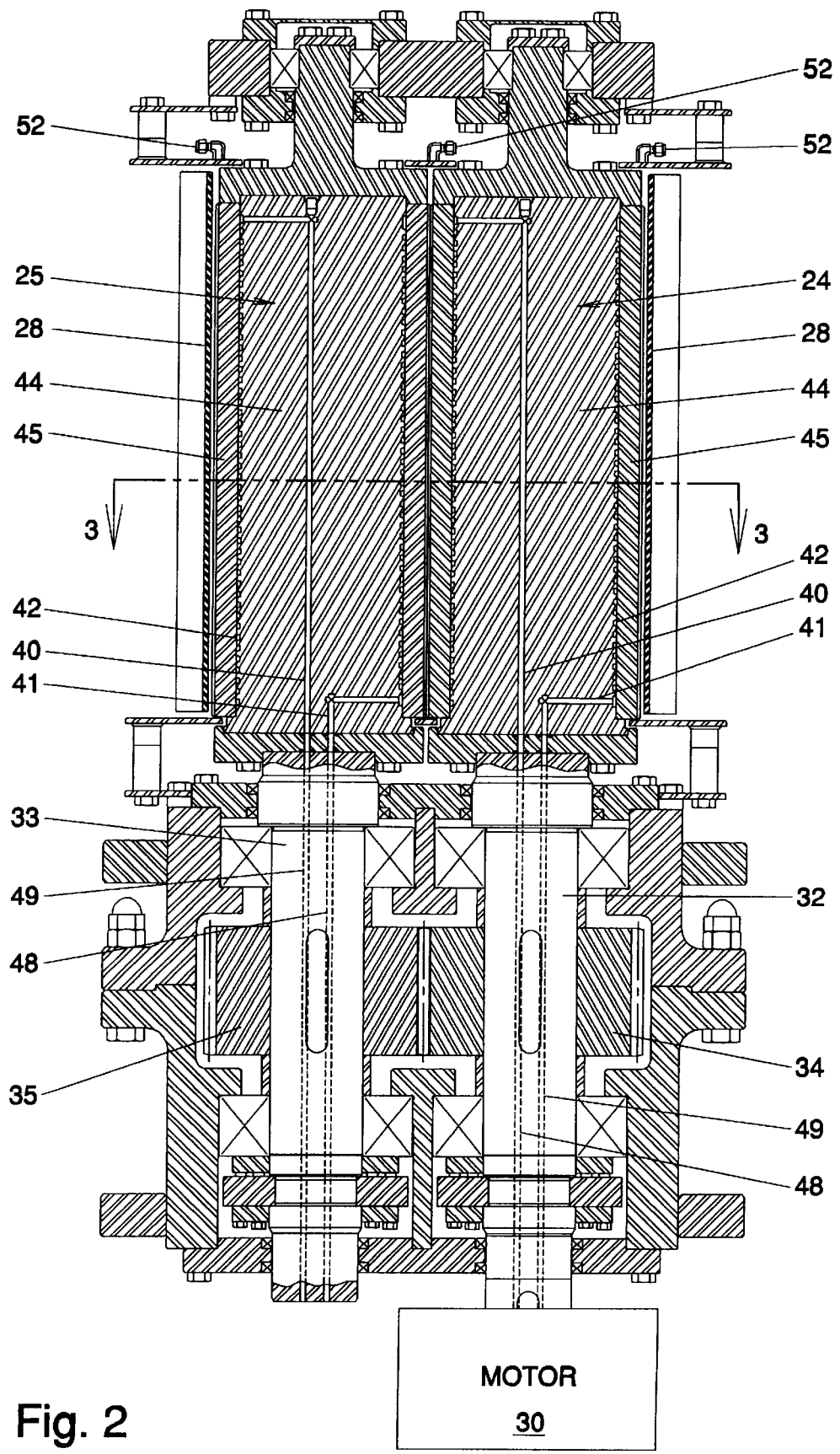
FIG. 2 is a partial longitudinal section view of a manipulating arrangement shown diagrammatically in FIG. 1.
Figure 3:
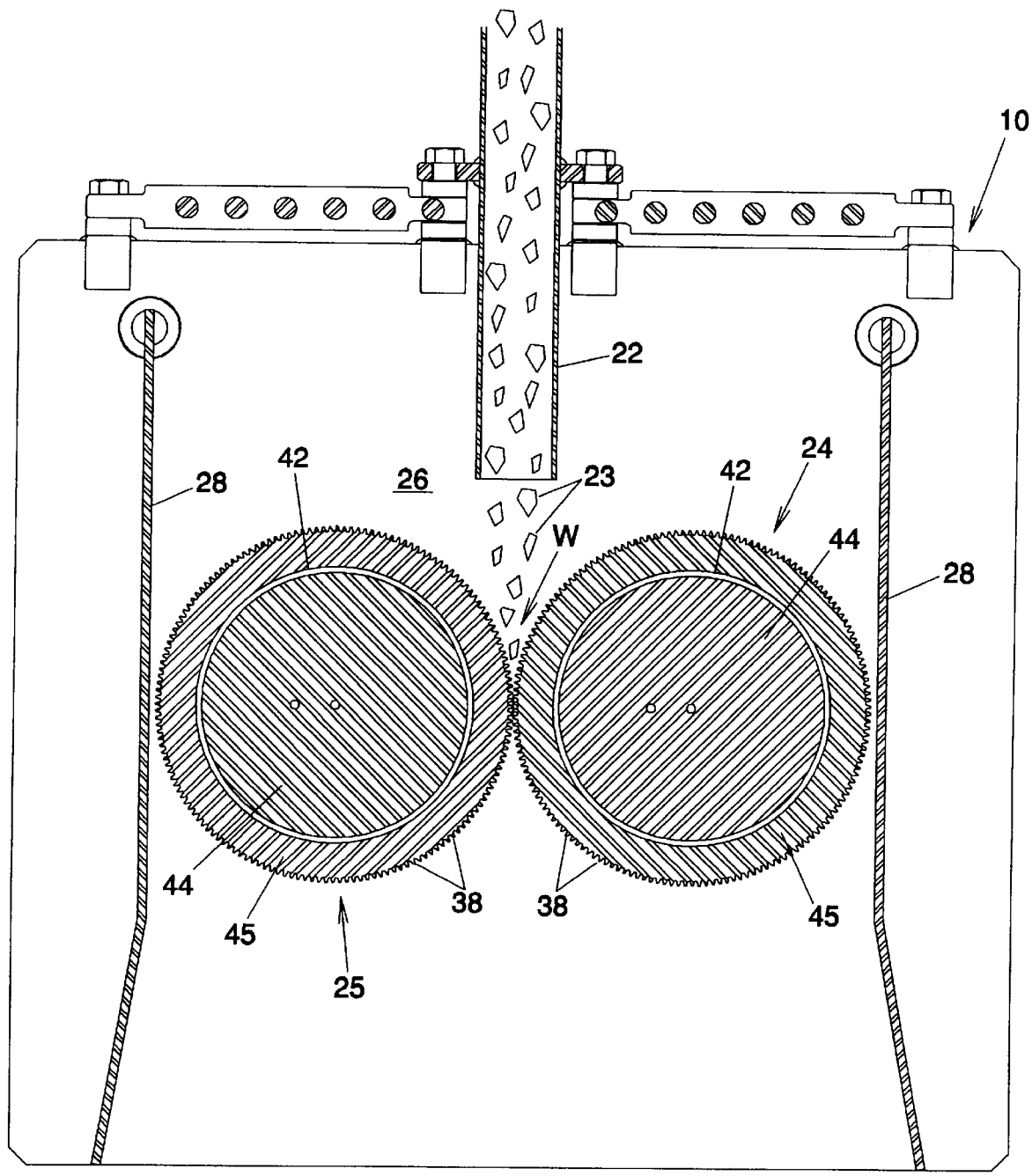
FIG. 3 is a partial transverse section view taken along line 3—3 in FIG. 2.

One preferred manipulating apparatus 10 is shown in FIGS. 2 and 3. Manipulating apparatus 10 includes a chute 22 through which workpieces 23 drop from the transport device 14 shown in FIG. 1. The illustrated manipulating apparatus 10 includes two spaced apart rollers 24 and 25 within a chamber 26. Rollers 24 and 25 are positioned within chamber 26 with their respective longitudinal axes extending substantially parallel to each other. Chamber walls 28 are positioned on either side of the two rollers. Rollers 24 and 25 are spaced apart with a minimum clearance between the roller surfaces which is less than an initial thickness of the workpieces 23. For example, workpieces 23 may be approximately 0.25 to 0.125 inches thick and the clearance between the opposing surfaces of rollers 24 and 25 may be approximately 0.10 inches. The spaced apart rollers 24 and 25 define a working area W extending from the point of minimum clearance between the roller surfaces upwardly to a point at which workpieces 23 first make contact with both rollers.

At least one of the rollers 24 or 25 is driven by a suitable drive motor so as to rotate about its longitudinal axis. The direction of rotation is toward the opposing roller. In the illustrated form of the invention, both rollers 24 and 25 are driven by a single drive motor 30 in a counter rotating fashion toward each other. Drive motor 30 drives first roller 24 directly through shaft 32 and timing gears 34 and 35 cooperate to drive the second roller 25. Timing gear 34 is mounted on drive shaft 32 while timing gear 35 is mounted on drive shaft 33 which is rigidly connected to second roller 25. Although not shown in the drawings, those skilled in the art will appreciate that drive motor 30 includes a suitable transmission arrangement for transmitting power to the first drive shaft 32. The drive motor 30 and associated transmission arrangement may be adapted for driving rollers 24 and 25 at a constant speed, or may be adapted to vary the speed to suit different processing rates.

Although rollers 24 and 25 may have a substantially smooth outer surface, the illustrated preferred rollers include longitudinally extending ridges 38. Rollers 24 and 25 are rotated in synchronization through the timing gears 34 and 35 so that each ridge 38 on one roller registers between adjacent ridges on the opposing roller similarly to the cogs of two intermeshed gears. However, the ridges 38 on the opposing rollers preferably do not touch, but always maintain a minimum clearance between the opposing roller surfaces, for example approximately 0.10 inches.

The manipulating apparatus 10 shown in FIGS. 2 and 3 also preferably includes a manipulator cooling system for cooling the outer surfaces of rollers 24 and 25, that is, the surfaces of the manipulating apparatus which may come in contact with workpieces 23. Cooling the outer surface of rollers 24 and 25 to a temperature near the process temperature prevents the rollers from heating workpieces 23 above the process temperature as the workpieces come in contact with the roller surfaces. A roller outer surface temperature which is near but just above the particular process temperature being employed also helps prevent workpieces 23 from sticking to the rollers 24 and 25. For example, the outer surfaces of the rollers 24 and 25 may be maintained at approximately 32 degrees Fahrenheit where the process temperature is approximately 28 degrees Fahrenheit or lower.

The illustrated cooling system includes for each roller 24 and 25 a coolant inlet 40 and a coolant outlet 41. A channel 42 extends near the outer surface of the respective roller and is preferably formed as a continuous spiral groove between an inner roller member 44 and an outer roller member 45. A coolant fluid is circulated through an inlet duct 48 associated with respective roller drive shaft 32 and 33 into the coolant inlet 40, through the continuous spiral channel 42, and out through outlet port 41 and outlet duct 49 formed in respective drive shaft. Any suitable coolant fluid may be circulated through the cooling system for cooling the outer surfaces of rollers 24 and 25 preferably to a temperature near the processing temperature, that is, the temperature of the frozen workpieces as they pass between the rollers. The system for producing the chilled coolant fluid, directing the fluid into inlet duct 48, and receiving the returning coolant fluid from outlet duct 49 is omitted from the drawings so as not to obscure the invention in unnecessary detail. Such system is within the knowledge of those skilled in the art.

The roller-type manipulating apparatus 10 shown in FIGS. 2 and 3 also preferably includes gas injection ports 52. Any suitable gas such as clean air may be injected through the gas injection ports 52 so as to flow over the outer surfaces of rollers 24 and 25. The injected gas helps clean the roller surfaces and separate foodstuff material which may partially stick to the roller surfaces.

Figure 5:
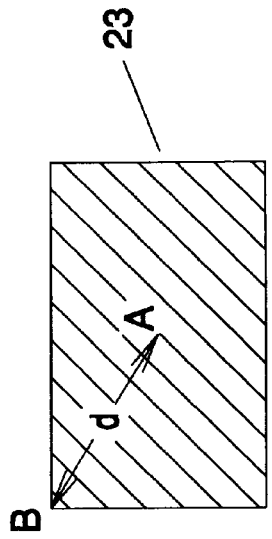
FIG. 5 is a view in section taken along line 5—5 in FIG. 4.
Figure 6:
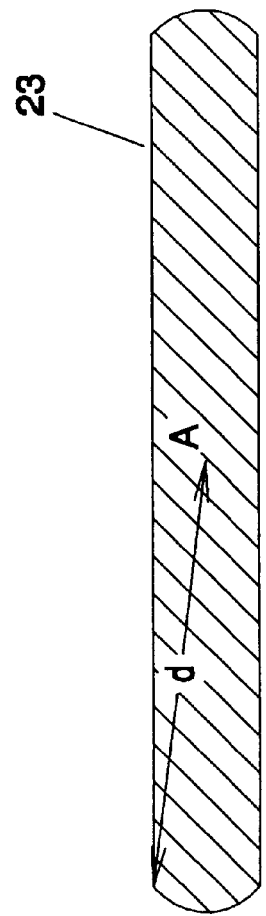
FIG. 6 is a view in section taken along line 6—6 in FIG. 4.
Figure 4:
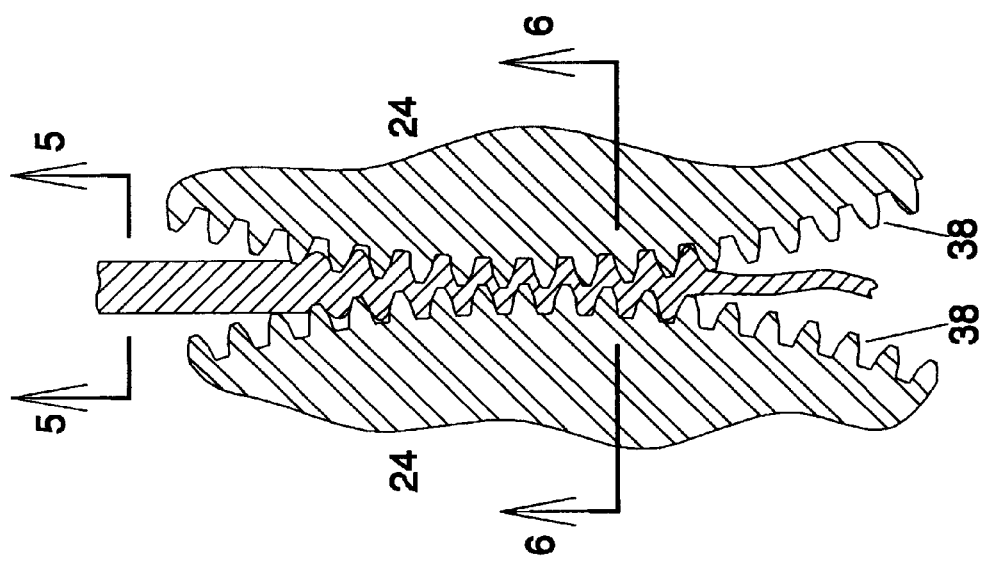
FIG. 4 is an enlarged diagrammatic side view of a piece of foodstuff being drawn between the rollers of a preferred manipulating arrangement.

In operation, the roller-type manipulating apparatus 10 shown in FIGS. 2 and 3 receives a plurality of workpieces 23 into chamber 26 immediately above rollers 24 and 25. As at least one of the rollers is rotated toward the opposite roller or both rollers are rotated toward each other in counter rotating fashion, workpieces 23 are drawn into the working area W and through the area of minimum clearance between the rollers. This action in shown best in FIGS. 4 through 6. Referring to FIGS. 4 and 5 each frozen workpiece retains generally its initial shape before passing into the working area W between rollers 24 and 25. However, as shown in FIG. 6, the workpiece material is forced to spread out laterally as the workpiece passes through the working area W and ultimately through the area of minimum clearance between rollers 24 and 25. This spreading of the workpiece material causes relative movement between points within the volume of the material. For example, referring to FIG. 5, a central point A in workpiece 23 resides a distance d to a point B at one corner of the workpiece. However, as the workpiece 23 spreads out as it passes between rollers 24 and 25 as shown in FIG. 6, the distance d between point A and point B changes significantly. This relative movement would occur even if rollers 24 and 25 each had a smooth outer surface. The ridged rollers 24 and 25 have the added advantage of forcing the workpiece material to bend around the opposing ridges 38. This bending in the workpiece material produces additional relative movement between various points within the material.

In the preferred form of the invention, the manipulating arrangement causes relative movement throughout the volume of the foodstuff being processed. Relative movement throughout the foodstuff ensures consistent microbe kill throughout the foodstuff. However, manipulation which produces relative movement in only a portion of the material being processed produces microbe kill in that portion of the material in which the relative movement occurs. Significant microbe kill can be accomplished according to the invention by manipulating the frozen comminuted foodstuff so as to produce relative movement in at least approximately twenty percent of the volume of the foodstuff. In the roller-type manipulating arrangement disclosed in FIGS. 1 through 6, the extent of relative movement in the workpieces is controlled primarily by the clearance between the rollers relative to the initial thickness of the workpieces. A clearance between rollers equal to ninety-five percent (95%) or less of the total initial thickness of the individual workpieces produces the desired relative movement in a significant volume of the foodstuffs being processed.

Figure 7:
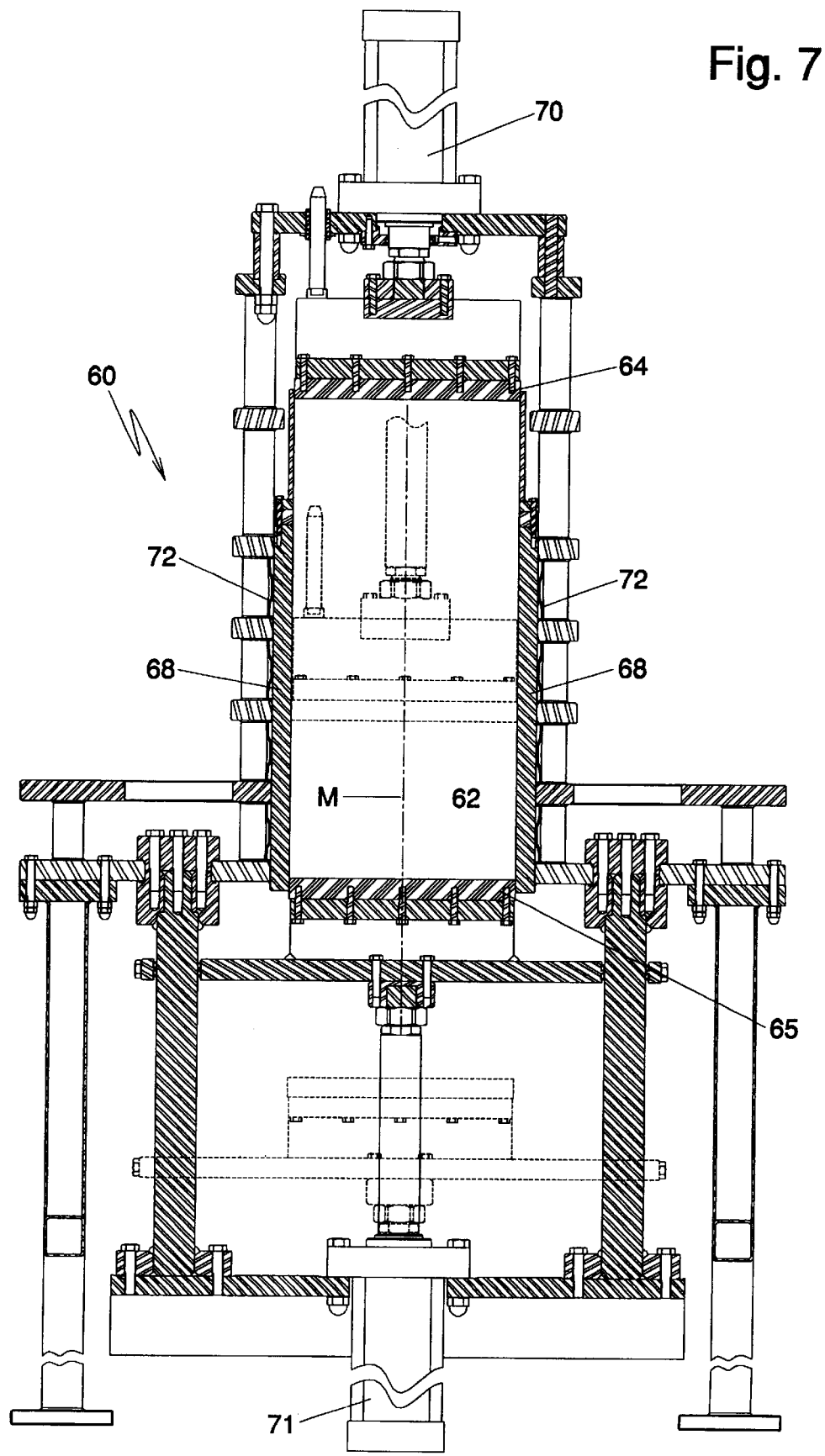
FIG. 7 is a partial section view showing an alternate manipulating arrangement embodying the principles of the invention.

FIG. 7 shows an alternate manipulating arrangement 60 according to the invention. In the form of invention shown in FIG. 7, workpieces (not shown in FIG. 7) are collected in an area 62 bounded by at least one movable plate. The form of invention shown FIG. 7 has both a movable top plate or platen 64 and a movable bottom plate or platen 65. Both top plate 64 and bottom plate 65 are movable along axis M relative to chamber walls 68. A top actuator 70 is associated with top plate 64 while a bottom actuator 71 is associated with bottom plate 65. Actuator 70 may comprise a suitable hydraulic or pneumatic piston and cylinder unit for positioning the top plate 64 along the axis M. Actuator 71 may similarly comprise a piston and cylinder arrangement for positioning bottom plate 65 along axis M. Chamber walls 68 may each have a structure 72 which allows a coolant fluid to be circulated there through for cooling the chamber walls to a temperature near the process temperature similarly to the rollers 24 and 25 discussed above with particular reference to FIGS. 2 and 3.

In operation, numerous small workpieces (not shown in FIG. 7) are randomly arranged in the area 62 defined by bottom plate 65 and chamber walls 68. The random arrangement of rigid small workpieces in the area 62 leaves numerous voids between the individual workpieces. Once the area is filled to a desired point, top actuator 70 is operated to move the top plate downwardly toward bottom plate 65 and into the area 62 defined between the chamber walls 68. A lowered position of top plate 64 is shown in phantom in FIG. 7. As top plate 64 advances toward bottom plate 65, the workpieces deform to fill the voids in the volume. This deformation produces relative movement throughout each workpiece.

Top plate 64 may be advanced downwardly until the individual workpieces (not shown in FIG. 7) in area 62 deform to produce substantially a solid block of material. At is point, bottom actuator 71 may be operated to move bottom plate 65 downwardly along axis M as top plate 64 continues downwardly. This downward movement of both top plate 64 and bottom plate 65 pushes the block formed from the frozen workpieces out from between chamber walls 68. Once the block clears chamber walls 68, the block of frozen material may be transferred by suitable means to another location for packaging for further processing.

Manipulating apparatus 60 shown in FIG. 7 is used in connection with a freezer and a transport device which are not shown in the drawing. The freezer may be the same type of freezer discussed with reference to FIG. 1. The transport device may be any suitable conveyor or other device for transporting the frozen workpieces from the freezer to the chamber area 62. The freezer preferably freezes the workpieces in less than 30 minutes and optimally in less than 10 minutes. Relatively small workpieces are preferable for use in the manipulating arrangement shown in FIG. 7. Workpieces having a size on the order of 0.5 inches by 0.5 inches by 0.25 inches ensure consistent relative movement within each workpiece. However larger or smaller thin pieces of frozen comminuted or ground foodstuffs may be effectively treated with the apparatus 60 shown in FIG. 7.

The manipulating process according to the invention is particularly applicable to comminuted foodstuffs. As used in this disclosure and in the following claims, a comminuted foodstuff may comprise any ground, chopped, or mixed foodstuff which is made up of relatively small pieces of foodstuffs which have been cut down or otherwise formed from larger pieces. The invention is well suited for treating ground meat such as beef, pork, or poultry. In the following examples, the process was applied to comminuted beef products. However, the invention may be used to treat substantially any comminuted foodstuff.

The manipulation according to the invention provides an immediate reduction in microbe count. However, microbe count decreases further for a period of time after the manipulation is performed. It is therefore preferable to use the processed foodstuffs no sooner than approximately 24 hours after the manipulation is performed. In this sense "use" the foodstuffs means cook the product or incorporate it into another food product.

EXAMPLE I

A test was conducted using the workpieces formed from comminuted beef products. Each workpiece measured approximately 0.125 inches thick, 0.5 inches wide, and 0.5 inches long. The workpieces had been maintained in three different sample boxes at a temperature of approximately 0 degrees Fahrenheit for approximately one month; each sample box contained a large number of workpieces. Workpieces removed at random from each of the boxes at the beginning of the one month storage period were used as controls for each respective box. The control samples were similarly maintained at approximately 0 degrees Fahrenheit. After the one month storage period, workpieces were collected at random from the three different sample boxes and separated into three corresponding test groups.

Each test group of workpieces was processed into a block of material in a plate-type manipulating device similar to that shown in FIG. 7, at a process temperature of approximately 0 degrees Fahrenheit. The plate-type manipulating device reduced the volume of each test group from an initial untreated volume of approximately 3600 cubic inches to a treated block volume of approximately 1800 cubic inches. After storing each test block for approximate one day at a temperature of 0 degrees Fahrenheit, samples were drilled from a side of each block at the top, bottom, and middle of each respective block. The drilled samples along with the control samples were maintained in a frozen state at approximately 0 degrees Fahrenheit for approximately 3 days after which the samples from the top, bottom, and middle of each block, as well as the control samples were tested for total plate count, $E.coli$ count, and Coliform count. The results of these tests for the samples taken from the first treated block are shown in Table 1, results for the second treated block are shown in Table 2, and results for the third treated block are shown in Table 3.

TABLE 1

|  | Total Plate Count | $E.\ coli$ | Coliform |
| --- | --- | --- | --- |
| Control | 25,000 | 1,000 | 2,400 |
| SIDE-TOP | 7,000 | 140 | 360 |
| SIDE-BOTTOM | 16,000 | 350 | 850 |
| MIDDLE | 9,200 | 450 | 790 |

TABLE 2

|  | Total Plate Count | E. coli | Coliform |
| --- | --- | --- | --- |
| Control | 25,000 | 1,000 | 2,400 |
| SIDE-TOP | 8,600 | 570 | 960 |
| SIDE-BOTTOM | 16,000 | 290 | 640 |
| MIDDLE | 26,000 | 310 | 620 |

TABLE 3

|  | Total Plate Count | E. coli | Coliform |
| --- | --- | --- | --- |
| Control | 25,000 | 1,000 | 2,400 |
| SIDE-TOP | 25,000 | 370 | 810 |
| SIDE-BOTTOM | 19,000 | 290 | 570 |
| MIDDLE | 12,000 | 430 | 770 |

EXAMPLE II

An additional test was conducted using workpieces formed from comminuted beef products. Each workpiece comprised the piece of the comminuted beef product measuring approximately 0.125 inches thick, 0.5 inches wide, and 0.5 inches long. The workpieces had been maintained at a temperature of approximately 0 degrees Fahrenheit for approximately one week after being formed. Several workpieces were drawn at random from a large number of workpieces and divided into a control sample group and three separate test sample groups numbered 1 through 3. The control sample group was maintained at approximately 0 degrees Fahrenheit for a storage period of approximately 3 days. Sample group No. 1 was maintained at a process temperature of approximately 0 degrees Fahrenheit and processed with a ridged roller-type manipulating apparatus similar to that shown in FIGS. 2 and 3, having a roller clearance of approximately 0.100 inches. After processing, the workpieces in sample group No. 1 were maintained at approximately 0 degrees Fahrenheit for the storage period. Sample groups Nos. 2 and 3 were processed with a smooth roller-type manipulating apparatus similar to that shown in FIGS. 2 and 3, with a roller clearance of approximately 0.100 inches. The process temperature for sample group Nos. 2 and 3 was approximately 0 degrees Fahrenheit. Sample groups Nos. 2 and 3 were then stored for the storage period at approximately 0 degrees Fahrenheit. After the storage period, the control group and sample group Nos. 1, 2, and 3 were tested for total plate count, *E.coli* count, Coliform count, and Staph count. The results of these tests are shown in Table 4.

TABLE 4

|  | Total Plate Count | E. coli | Coliform |
| --- | --- | --- | --- |
| Control Sample | 61,000 | 400 | 1,200 |
| Sample Group 1 | 21,000 | 60 | 380 |
| Sample Group 2 | 44,000 | 280 | 840 |
| Sample Group 3 | 45,000 | 200 | 730 |

The above described preferred embodiments are intended to illustrate the principles of the invention, but not to limit the scope of the invention. Various other embodiments and modifications to these preferred embodiments may be made by those skilled in the art without departing from the scope of the following claims. For example, a screw press or compressor may be used as the manipulating device in place of the block forming arrangement shown in FIG. 8 or roller-type manipulating device shown in FIGS. 2 and 3. Also, although the invention is described as processing individual workpieces formed from the foodstuff to be treated, the roller-type treatment apparatus such as that shown in FIGS. 2 and 3 may operate on a substantially continuous strand or strands of frozen foodstuff. Each such strand is to be considered an equivalent of the workpieces described above and set out in the following claims.

What is claimed is:

1. A process for manipulating comminuted foodstuffs to decrease live microbe content therein, the process comprising:
   (a) cooling comminuted foodstuffs to be processed to a process temperature below the freezing point of the foodstuff, and forming the foodstuffs to be processed into a plurality of workpieces; and
   (b) manipulating the workpieces within a working area, the manipulation producing relative movement between points within each workpiece, the relative movement occurring substantially throughout each workpiece.

2. The method of claim 1 further comprising the step of:
   (a) cooling surfaces which come in contact with the workpieces when the workpieces are manipulated, said surfaces being cooled to a temperature approximately equal to the process temperature.

3. The method of claim 1 wherein the step of manipulating the workpieces comprises:
   (a) passing the workpieces between a first roller and a second roller, the second roller being spaced apart from the first roller such that the clearance between the first roller and second roller is less than an initial thickness of each workpiece so that each workpiece is compressed and allowed to expand laterally as the respective workpiece advances between the first roller and second roller.

4. The method of claim 3 wherein the workpiece has an initial thickness of between approximately 0.25 inches and 0.125 inches.

5. The method of claim 4 wherein the clearance between the first roller and second roller is approximately 0.10 inch.

6. The method of claim 1 wherein the process temperature is no greater than approximately 28 degrees Fahrenheit.

7. An apparatus for manipulating foodstuffs to reduce microbe content, the foodstuffs comprising pieces of comminuted foodstuffs which have been cooled to a process temperature below the freezing point of the foodstuffs, the apparatus comprising:
   (a) a first roller;
   (b) a second roller having a rotational axis substantially parallel to a rotational axis of the first roller, the second roller being spaced apart from the first roller such that the clearance between the first roller and second roller is less than an initial thickness of the foodstuff pieces so that the pieces are compressed and allowed to expand laterally as they are drawn between the first roller and second roller; and
   (c) a drive arrangement for driving at least the first roller about its rotational axis toward the second roller.

8. The apparatus of claim 7 wherein:
   (a) the drive arrangement drives both the first roller and the second roller in a counter rotating fashion;
   (a) the surface of the first roller and the second roller each include circumferentially spaced apart longitudinal ridges, each ridge on the first roller registering with a space between adjacent ridges on the second roller as the rollers rotate about their respective longitudinal axis.

9. The apparatus of claim 7 further comprising:
(a) a manipulator cooling system for cooling surfaces of the first roller and the second roller to a temperature no greater than substantially the process temperature.

10. An apparatus for manipulating foodstuffs to reduce microbe content, the apparatus comprising:
(a) a freezer for cooling a workpiece to a process temperature below the freezing point of the workpiece, the workpiece comprising a piece of foodstuff to be processed;
(b) a manipulating arrangement comprising a first roller and a second roller, the second roller having a rotational axis substantially parallel to a rotational axis of the first roller and being spaced apart from the first roller such that the clearance between the first roller and second roller is less than an initial thickness of the workpiece so that the workpiece is compressed and allowed to expand laterally as the workpiece is drawn between the first roller and second roller;
(c) a drive arrangement for driving at least the first roller about its rotational axis toward the second roller; and
(d) a transport device for transporting the workpiece from the freezer to the manipulating arrangement.

11. The apparatus of claim 10 wherein:
(a) the drive arrangement drives both the first roller and the second roller in a counter rotating fashion;
(b) the surface of the first roller and the second roller each include circumferentially spaced apart longitudinal ridges, each ridge on the first roller registering with a space between adjacent ridges on the second roller as the rollers rotate about their respective longitudinal axis.

12. The apparatus of claim 10 wherein the workpiece has an initial thickness of between 0.25 inches and 0.125 inches.

13. The apparatus of claim 12 wherein the clearance between the first roller and second roller is approximately 0.10 inches.

14. An apparatus for manipulating a comminuted foodstuff to reduce microbe content therein, the apparatus comprising:
(a) a freezer for rapidly cooling the comminuted foodstuff to a process temperature below the freezing point of the comminuted foodstuff;
(b) a manipulating arrangement defining a working area, the manipulating arrangement for manipulating a workpiece of the comminuted foodstuff at the process temperature, the manipulation producing relative movement between points within the workpiece and the relative movement occurring substantially throughout the workpiece; and
(c) a transport device for transporting the workpiece from the freezer to the manipulating arrangement.

15. The apparatus of claim 14 further comprising:
(a) a manipulator cooling system for cooling surfaces of the manipulating arrangement which come in contact with the workpiece to a temperature approximately equal to the process temperature.

16. The apparatus of claim 14 wherein the process temperature is no greater than 28 degrees Fahrenheit.

17. The apparatus of claim 14 wherein the freezer brings the temperature of the comminuted foodstuff from an initial temperature above freezing to the process temperature in no more than thirty minutes.

18. The apparatus of claim 14 further comprising:
(a) a forming device for forming the comminuted foodstuff into the workpiece.

19. The apparatus of claim 14 wherein the manipulating arrangement comprises:
(a) a press having a first plate in a spaced apart relationship with a second plate, and an actuator system for decreasing the distance between the first plate and second plate to manipulate the workpieces, the area between the first plate and second plate defining the working area.

* * * * *